United States Patent
Mueller et al.

(10) Patent No.: US 8,297,584 B2
(45) Date of Patent: Oct. 30, 2012

(54) MOTOR VEHICLE HAVING AN EXTERIOR REARVIEW MIRROR

(75) Inventors: Marcus Mueller, Pforzheim (DE); Gabi Koerner, Wiernsheim (DE)

(73) Assignee: Dr. Ing. h.c.F. Porsche Aktiengesellschaft (DE)

( * ) Notice: Subject to any disclaimer, the term of this patent is extended or adjusted under 35 U.S.C. 154(b) by 105 days.

(21) Appl. No.: 12/977,656

(22) Filed: Dec. 23, 2010

(65) Prior Publication Data

US 2011/0157734 A1 Jun. 30, 2011

(30) Foreign Application Priority Data

Dec. 24, 2009 (DE) .......................... 10 2009 060 462

(51) Int. Cl.
*B60R 1/06* (2006.01)
(52) U.S. Cl. ..................................... 248/475.1; 359/871
(58) Field of Classification Search .................. 359/871; 248/475.1
See application file for complete search history.

(56) References Cited

U.S. PATENT DOCUMENTS

| | | | | |
|---|---|---|---|---|
| 2,724,996 A | * | 11/1955 | O'Shei | 248/475.1 |
| 2,854,893 A | * | 10/1958 | Henshall | 248/475.1 |
| 2,914,988 A | * | 12/1959 | O'Shei | 248/475.1 |
| 4,253,633 A | * | 3/1981 | Takegawa | 248/475.1 |
| 6,220,716 B1 | * | 4/2001 | Asaka | 359/871 |
| 6,488,382 B1 | * | 12/2002 | Mertens | 359/871 |
| 6,609,800 B2 | * | 8/2003 | Assinder et al. | 359/841 |
| 2007/0201153 A1 | * | 8/2007 | Tanaka | 359/838 |
| 2008/0062545 A1 | * | 3/2008 | Su | 359/879 |
| 2009/0015955 A1 | | 1/2009 | Muller | |
| 2009/0134304 A1 | | 5/2009 | Rieder et al. | |
| 2012/0033313 A1 | * | 2/2012 | Herrmann et al. | 359/872 |

FOREIGN PATENT DOCUMENTS

| | | |
|---|---|---|
| DE | 10 2007 032 901 A1 | 1/2009 |
| DE | 10 2007 056 671 A1 | 5/2009 |
| JP | 61018534 A * | 1/1986 |
| JP | 63222951 A * | 9/1988 |

OTHER PUBLICATIONS

German Patent and Trademark Office Search Report, Dated Sep. 22, 2010.

* cited by examiner

*Primary Examiner* — Mark Consilvio
(74) *Attorney, Agent, or Firm* — Gerald E. Hespos; Michael J. Porco

(57) ABSTRACT

A motor vehicle has an exterior rearview mirror, which is fixed to a vehicle door by a mirror baseplate. An opening, through which the mirror baseplate engages, is provided in an outer skin of the vehicle door, and the mirror baseplate is secured by a multi-point support and a central attachment screw. The mirror baseplate contains, at its free end, a conical attachment which engages in an opening of a door shaft reinforcement, formed as an extruded profile part, a hollow profile part, or a profiled sheet-stamped part, of the vehicle door, as a result of which the exterior rearview mirror is pre-positioned in a positionally correct fashion in the longitudinal direction of the vehicle. The mirror baseplate is additionally supported on the door shaft reinforcement by a five-point support.

6 Claims, 3 Drawing Sheets

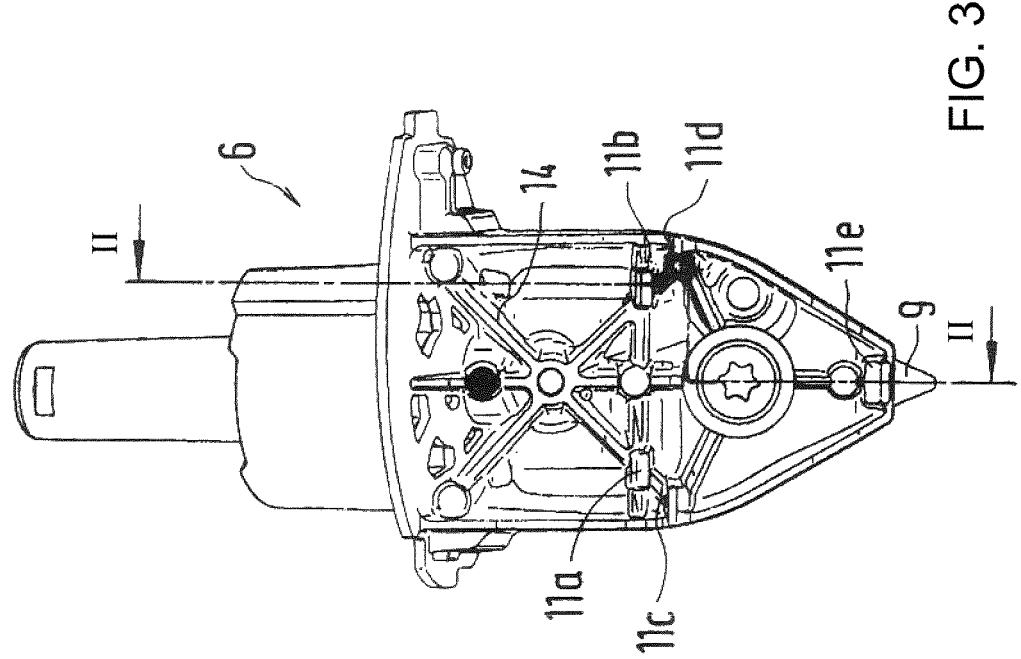
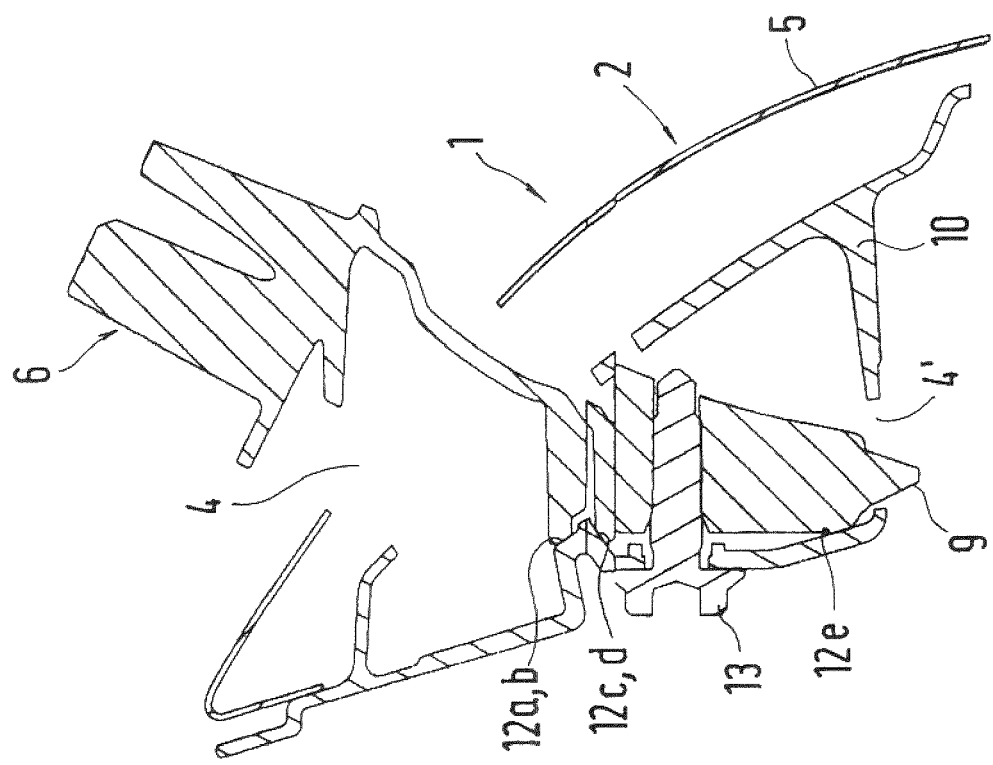

MOTOR VEHICLE HAVING AN EXTERIOR REARVIEW MIRROR

CROSS-REFERENCE TO RELATED APPLICATION

This application claims the priority, under 35 U.S.C. §119, of German application DE 10 2009 060 462.6, filed Dec. 24, 2009; the prior application is herewith incorporated by reference in its entirety.

BACKGROUND OF THE INVENTION

Field of the Invention

The present invention relates to a motor vehicle having an exterior rearview mirror, which is secured to a vehicle door by of a mirror baseplate. The invention also relates to an exterior rearview mirror which is specially configured for such a motor vehicle.

Published, non-prosecuted German patent application DE 10 2007 032 901 A1, corresponding to U.S. patent publication No. 2009/0015955 A1, discloses a motor vehicle of the generic type having an exterior rearview mirror which is fixed to a vehicle door of the motor vehicle by a mirror baseplate. An opening, through which the mirror baseplate engages, and wherein the mirror baseplate is simultaneously secured to the vehicle door by a six-point support and a central attachment screw, is provided here in an outer skin of the vehicle door. Provided in the vehicle door here is an inner reinforcement which is formed by a pressure die-cast part which is made of a lightweight metal alloy and to which the mirror baseplate is connected, as a result of which an extremely rigid, play-free and simple connection of the exterior rearview mirror to the motor vehicle can be ensured. The dimensionally accurate fabrication of the six-point support between the mirror baseplate and the inner reinforcement requires a high level of fabrication expenditure and is cost-intensive.

Published, non-prosecuted German patent application DE 10 2007 056 671 A1, corresponding to U.S. patent publication No. 2009/0134304 A1 in turn discloses a system for attaching an exterior mirror to a vehicle door having a reinforcement which is arranged fixedly on the vehicle door. The reinforcement has here a plug-in shaft which holds an exterior mirror baseplate and has a clamping device which can be activated by at least one screw, wherein a through-opening which is aligned with the plug-in shaft in the outer skin of the door is provided for the exterior mirror baseplate. The at least one attachment screw of the clamping device is accessible here via a door shaft, open in the upward direction, of the vehicle door, which is intended to make possible simple mounting and/or dismounting of the exterior mirror.

SUMMARY OF THE INVENTION

It is accordingly an object of the invention to provide a motor vehicle having an exterior rearview mirror which overcomes the above-mentioned disadvantages of the prior art devices of this general type, which is an improved, or at least an alternative, embodiment which is defined, in particular, by an improved connection, that is to say attachment, of the exterior rearview mirror to the vehicle door.

With the foregoing and other objects in view there is provided, in accordance with the invention a motor vehicle. The motor vehicle contains a vehicle door having an outer skin with a first opening formed therein. The vehicle door further includes a door shaft reinforcement formed by an extruded profile part and having a second opening formed therein. The motor vehicle further contains a mirror baseplate having a five-point support, a multi-point support, a central attachment screw, and an exterior rearview mirror fixed to the vehicle door by the mirror baseplate. The mirror baseplate engages through the first opening in the outer skin of the vehicle door. The mirror baseplate is secured by the multi-point support and the central attachment screw. The mirror baseplate has a free end with a conical attachment which, when the exterior rearview mirror is mounted, engages in the second opening of the door shaft reinforcement of the vehicle door, as a result of which the exterior rearview mirror is pre-positioned in a positionally correct fashion in a longitudinal direction of the motor vehicle. For precise positioning of the exterior rearview mirror in transverse and vertical directions of the motor vehicle, the mirror baseplate is additionally supported on the door shaft reinforcement by the five-point support.

The present invention is based on the general idea of securing an exterior rearview mirror to a vehicle door of a motor vehicle in a way which is as simple but at the same time as reliable as possible by integrally forming on a conical attachment to a free end of the mirror baseplate of the exterior rearview mirror for the positionally-correct pre-positioning in the longitudinal direction of the vehicle, and at the same time a plurality of bearing faces are provided by which the exterior rearview mirror can be supported on the vehicle door in the manner of a five-point support.

The exterior rearview mirror is generally secured to the vehicle door by a mirror baseplate, wherein an opening, through which the mirror baseplate engages, is provided in an outer skin of the vehicle door. In addition, the mirror baseplate has the above-mentioned conical attachment which engages in a correspondingly configured opening in a door shaft reinforcement of the vehicle door and as a result pre-positions the mirror baseplate in a positionally correct fashion, at least in the longitudinal direction of the vehicle. The pre-positioning in conjunction with the five-point support makes possible a securing position of the exterior rearview mirror to the vehicle door which can be precisely predefined and can be assumed in a uniquely defined fashion. For the definitive securement, just one central attachment screw is necessary which is advantageously turned into the mirror baseplate from an interior of the vehicle door through the door shaft reinforcement.

The mirror baseplate which is embodied according to the invention at the same time significantly simplifies the mounting of the mirror baseplate to the vehicle door since the mirror baseplate merely has to be plugged into the door-shaft-reinforcement-side opening and placed in abutment, by its bearing faces, with the door shaft reinforcement. The conical attachment and the five-point support only permit a single securing position of the mirror baseplate in relation to the vehicle door or the door shaft reinforcement here so that the attachment screw can then be immediately tightened and therefore the mirror baseplate secured. In a further method step, a mirror head, which has the actual mirrored surface, is plugged onto the mirror baseplate or forms an electrical connection thereto.

In one advantageous development of the solution according to the invention, the door shaft reinforcement is formed by an extruded profile made of a lightweight metal alloy. In general, such extruded profiles can be manufactured cost-effectively effectively and with a high degree of dimensional accuracy from a lightweight metal alloy (for example aluminum), which is advantageous in particular in the construction of motor vehicles. Since aluminum is also a lightweight metal, the door shaft reinforcement which is used to connect the exterior rearview mirror is not only comparatively rigid but also of comparatively lightweight construction, which is in turn highly advantageous in the construction of sports vehicles. Alternatively, the door shaft reinforcement can be formed as a hollow profiled piece or as a profiled sheet-stamped part.

Other features which are considered as characteristic for the invention are set forth in the appended claims.

Although the invention is illustrated and described herein as embodied in a motor vehicle having an exterior rearview mirror, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SEVERAL VIEWS OF THE DRAWING

FIG. 2 is a sectional view taken along the sectional plane II-II shown in FIG. 3 through a connecting region of the exterior rearview mirror to the vehicle door;

FIG. 3 is a diagrammatic, perspective view of the mirror baseplate of the exterior rearview mirror;

DETAILED DESCRIPTION OF THE INVENTION

Figure 1:
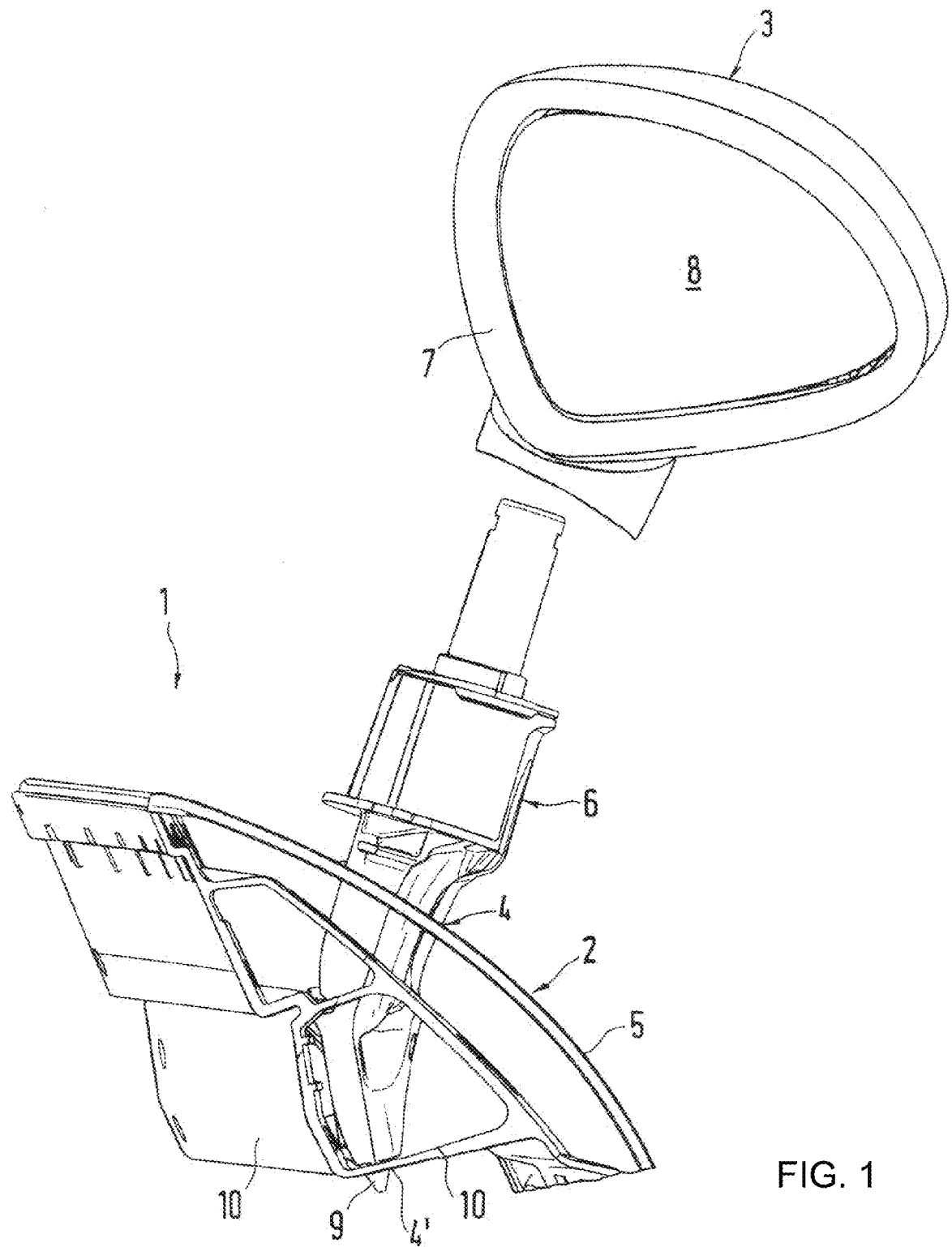
FIG. 1 is a diagrammatic, perspective view of a partial region of a vehicle door of a motor vehicle having an exterior rearview mirror according to the invention.

Referring now to the figures of the drawing in detail and first, particularly, to FIG. 1 thereof, there is shown a motor vehicle 1 according to the invention, of which only a partial region of a vehicle door 2 having an exterior rearview mirror 3 is shown. The motor vehicle 1 has an opening 4 in an outer skin 5 of the vehicle door 2, through which a mirror baseplate 6 of the exterior rearview mirror 3 engages. In general, the exterior rearview mirror 3 is composed of an above-mentioned mirror baseplate 6 as well as a mirror head 7 which is plugged and attached thereon and which contains the actual mirrored surface 8. The mirror baseplate 6 has, at its free end facing away from the mirror head 7, a conical attachment 9 which engages in an opening 4' of a door shaft reinforcement 10 of the vehicle door 2 (see also FIG. 2). The opening 4' is embodied as an elongate hole, with the larger longitudinal extent extending in the transverse direction of the vehicle. The smaller longitudinal extent of the elongate hole extends in the longitudinal direction of the vehicle and is only slightly larger than the maximum diameter of the conical attachment 9. The door shaft reinforcement 10 is formed by an extruded profile part from a lightweight metal alloy (for example aluminum alloy) and as a result has, on the one hand, a high strength and, on the other hand, a low weight. The door shaft reinforcement 10 can alternatively be formed as a hollow profiled (molded) part, for example a rolled hollow profiled part or as a profiled sheet-stamped part.

The door shaft reinforcement 10 can extend over either the entire length of the vehicle door 2 or over a section of the length of the vehicle door 2, for example only in a region of the junction/connection of the rear view mirror 3.

By the conical attachment 9, the mirror baseplate 6 is pre-positioned, at least in the longitudinal direction of the vehicle, with respect to the opening 4' in the door shaft reinforcement 10. Furthermore, the mirror baseplate 6 has, for precise positioning in the transverse and vertical directions of the vehicle, a five-point support composed of—in the example shown—five relatively small bearing faces 11a-11e, via which the mirror baseplate 6 is supported on the door shaft reinforcement 10 or on opposing bearing faces 12a-12e which are arranged in a complementary fashion thereto. The five bearing faces 11a-11e together with the opposing bearing faces 12a-12e therefore form a five-point support which brings about, together with the presecurement in the longitudinal direction of the vehicle, a uniquely defined secured position of the mirror baseplate 6 and therefore of the exterior rearview mirror 3 with respect to the door shaft reinforcement 10.

The mirror-baseplate-side bearing faces 11a and 11b, and 11c and 11d, respectively, are each arranged aligned with one another, viewed in the longitudinal direction of the vehicle, and spaced apart from one another in the longitudinal direction of the vehicle, with the bearing faces 11a and 11c, and 11b and 11d, respectively, extending in such a way that they rest one on top of the other and at a small vertical distance from one another, viewed in the vertical direction. The bearing face 11e extends just above the conical attachment 9 of the mirror baseplate and approximately centrally between the bearing faces 11a, 11c and 11b, 11d, respectively, viewed in the longitudinal direction of the vehicle.

The bearing faces 12a, 12b and 12c, 12d of the door shaft reinforcement 10 are provided on a continuous, profiled formed-on portion of the extruded profile part, with this formed-on portion, which extends in the longitudinal direction of the vehicle, being in the shape of an inverted V and being composed of two obliquely extending wall sections. Alternatively, the bearing faces 12a, 12b and 12c, 12d are formed as hollow profiled (molded) parts or as profiled sheet-stamped parts.

The exterior rearview mirror 3 is attached to the vehicle door 2 by a single, central attachment screw 13 (see FIGS. 2 and 3) which is screwed into the mirror baseplate 6 from the inside through the door shaft reinforcement 10. The mounting and dismounting of the exterior rearview mirror 3 according to the invention is particularly easily possible by virtue of the merely one attachment screw 13. The attachment screw 13 is covered here, for example, by a non-illustrated cover element and therefore can be accessed without, for example, having to laboriously remove a door inner trim beforehand. As is apparent here in particular from FIG. 2, the attachment screw 13 is arranged essentially horizontally and is therefore easily accessible to an operative. When the attachment screw 13 is tightened, there is no longer any positively locking engagement between the conical attachment 9 and the opening 4' in the door shaft reinforcement 10.

Figure 5:
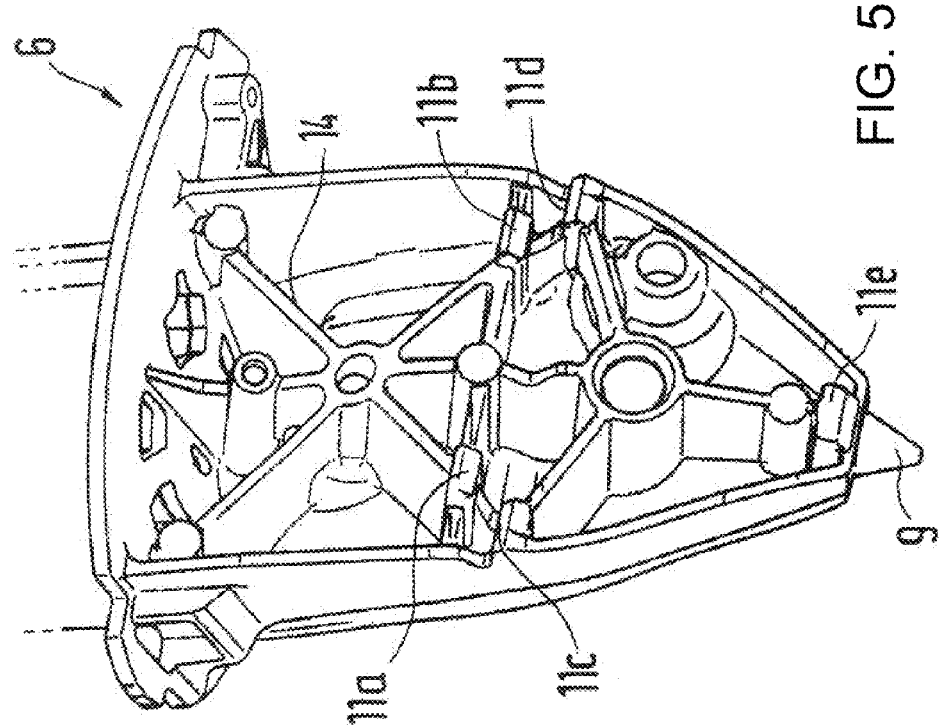
FIG. 5 is a diagrammatic, perspective view of a detail of the mirror baseplate.
Figure 4:
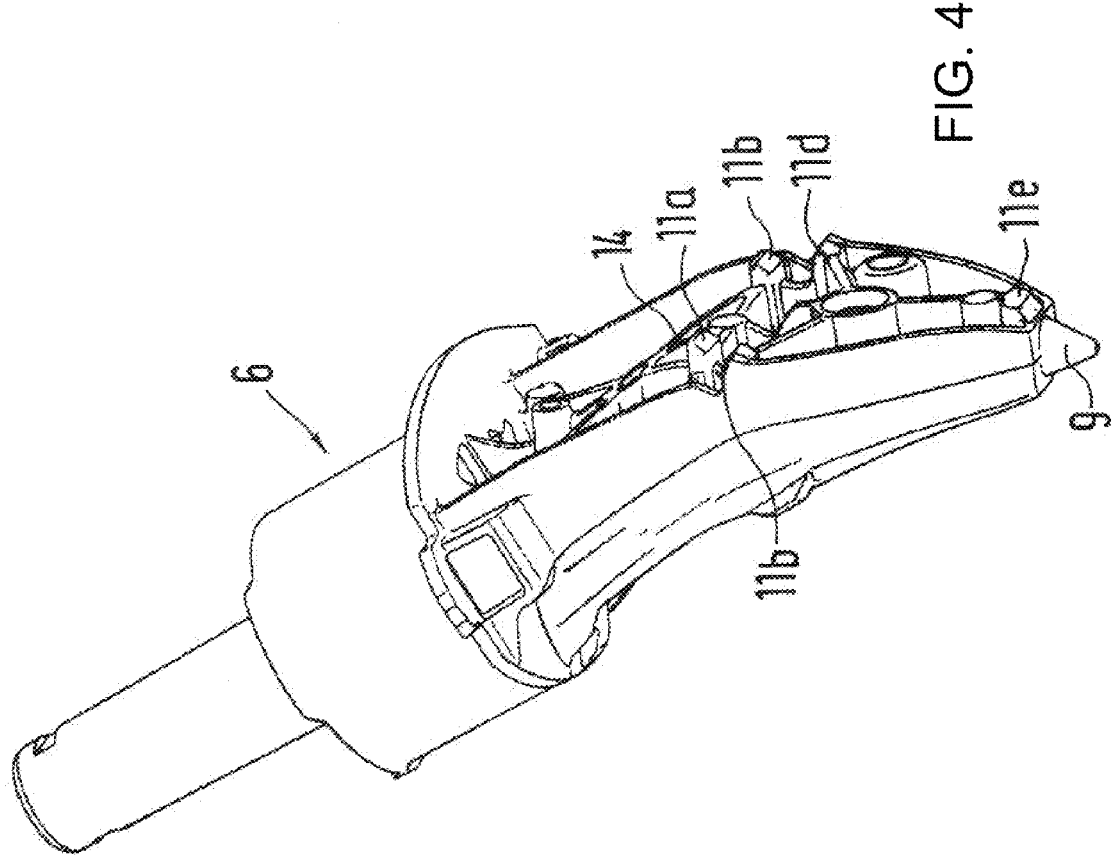
FIG. 4 is a perspective view, as in FIG. 3, but from a different perspective.

If FIGS. 3-5 are considered, it is apparent that the mirror baseplate 6 has a considerable number of reinforcing ribs 14 which reinforce the mirror baseplate 6 and as a result reliably support the mirror head 7. The mirror baseplate 6 may be embodied, for example, as a lightweight metal component or else from plastic, in particular as what is referred to as a plastic injection molded part. The bearing faces 11a-11e extend obliquely or obliquely with respect to one another and are spaced apart from one another, as a result of which a wide support of the mirror baseplate 6 on the opposing bearing faces 12a-12e of the door shaft reinforcement 10 is produced.

The exterior rearview mirror 3 according to the invention ensures simplified, but at the same time extremely precise mounting thereof, to the vehicle door 2, wherein both the conical attachment 9 and the bearing faces 11a-11e contribute to being able to secure the exterior rearview mirror 3 to the vehicle door 2 in a particularly positionally accurate fashion. The mounting is additionally simplified by virtue of the fact that just a single attachment screw 13 is provided. The exclusive accessibility of the attachment screw 13 from the interior of the vehicle door 2 improves protection against theft at the same time.

The exterior rearview mirror 3 according to the invention generally provides the now described advantages. First, a simple and rapid mounting, in particular by virtue of pre-centering of the exterior rearview mirror 3 in the longitudinal direction of the vehicle when it is fitted onto the door shaft reinforcement 10, is possible. Second, a precise joint structure between the mirror baseplate 6 and the outer skin 5 is formed. Third, a minimized mirror glass vibration through freedom from play of the connection and a high level of rigidity of the five-point support is formed. By virtue of the static determination of the connection, a precise calculation is possible and as a result the necessary rigidity can be determined and formed even at an early stage. Fourth, no application of forces from the mirror baseplate 6 to the outer skin 5 is needed and as a result avoidance of denting problems occurs. Fifth, no additional costs whatsoever since no additional components or processing steps are required and previously used fabrication methods and tools can be retained. Sixth, there is increased protection against theft and seventh a simple dismounting in the after-sales market occurs since it is not necessary to dismount a door inner trim in order to dismount the exterior rearview mirror 3.

The invention claimed is:

1. A motor vehicle, comprising:
   a vehicle door having an outer skin with a first opening formed therein, said vehicle door further including a door shaft reinforcement formed as an extruded profile part, a hollow profile part, or a profiled sheet-stamped part, and having a second opening formed therein;
   a mirror baseplate having a five-point support;
   a multi-point support;
   a central attachment screw;
   an exterior rearview mirror affixed to said vehicle door at said mirror baseplate, said mirror baseplate engaging through said first opening in said outer skin of said vehicle door, said mirror baseplate being secured at said multi-point support and said central attachment screw; and
   said mirror baseplate having a free and with a conical attachment which, when said exterior rearview mirror is mounted, engages in said second opening of said door shaft reinforcement of said vehicle door, so that said exterior rearview mirror is pre-positioned in a positionally correct fashion in a longitudinal direction of the motor vehicle, and in fact for a precise positioning of said exterior rearview mirror in transverse and vertical directions of the motor vehicle, said mirror baseplate is additionally supported on said door shaft reinforcement at said five-point support.

2. The motor vehicle according to claim 1, wherein said extruded profile part which forms said door shaft reinforcement is manufactured from a lightweight metal alloy.

3. The motor vehicle according to claim 1, wherein:
   said door shaft reinforcement has opposing bearing faces; and
   said five-point support is formed by five bearing faces that are spaced apart from one another on said mirror baseplate and interact with said opposing bearing faces which are disposed on said door shaft reinforcement.

4. The motor vehicle according to claim 1, wherein access to said central attachment screw is possible only from inside.

5. The motor vehicle according to claim 1, wherein said central attachment screw is covered by a cover element.

6. The motor vehicle according to claim 1, wherein said central attachment screw is disposed horizontally.

* * * * *